(12) United States Patent
Hughes

(10) Patent No.: US 12,722,434 B2
(45) Date of Patent: Sep. 1, 2026

(54) TRAILER COUPLER AND METHOD FOR SAME

(71) Applicant: Kevin Bruce Hughes, Waxahachie, TX (US)

(72) Inventor: Kevin Bruce Hughes, Waxahachie, TX (US)

( * ) Notice: Subject to any disclaimer, the term of this patent is extended or adjusted under 35 U.S.C. 154(b) by 634 days.

(21) Appl. No.: 18/092,776

(22) Filed: Jan. 3, 2023

(65) Prior Publication Data

US 2023/0211639 A1 Jul. 6, 2023

Related U.S. Application Data

(60) Provisional application No. 63/295,979, filed on Jan. 3, 2022.

(51) Int. Cl.
*B60D 1/36* (2006.01)

(52) U.S. Cl.
CPC .................................... *B60D 1/36* (2013.01)

(58) Field of Classification Search
CPC ............ B60D 1/36; B60D 1/363; B60D 1/58
See application file for complete search history.

(56) References Cited

U.S. PATENT DOCUMENTS 3,015,162 A * 1/1962 Bohnet .................... B60D 1/36 116/28 R
3,363,318 A * 1/1968 Folkins .................... B60D 1/36 116/28 R
3,702,029 A * 11/1972 Anderson, Jr. .......... B60D 1/36 280/477
3,720,000 A * 3/1973 Schlegel ................ B60Q 1/305 280/477
3,774,149 A * 11/1973 Bennett .................... B60D 1/36 340/436
3,818,599 A * 6/1974 Tague ...................... B60D 1/36 280/477
3,889,384 A * 6/1975 White .................... B60Q 1/305 33/DIG. 1
3,901,536 A * 8/1975 Black ..................... B60Q 1/305 340/687
3,918,746 A * 11/1975 Lehtisaari ............. G01C 15/00 280/477
3,966,231 A * 6/1976 Metzler .................... B60D 1/36 280/477
4,192,526 A * 3/1980 Myers ...................... B60D 1/36 280/477
4,285,138 A * 8/1981 Berry ....................... B60D 1/36 280/477
4,583,481 A * 4/1986 Garrison .................. B60D 1/36 D12/162

(Continued)

*Primary Examiner* — Timothy Wilhelm
(74) *Attorney, Agent, or Firm* — Braxton IP PLLC; Bobby W. Braxton

(57) ABSTRACT

A system and method for coupling a trailer. The system includes a base, a coupler, and an indicator. The indicator has a vertical portion and a horizontal portion. The vertical portion extends the horizontal portion to a plane where the horizontal portion is visible to a driver. The horizontal portion has a free end. When the free end is touching or adjacent to a trailer connector, then the trailer connector is aligned vertically over a trailer hitch. The trailer can be lowered, coupling the trailer to the vehicle.

17 Claims, 3 Drawing Sheets

(56) References Cited

U.S. PATENT DOCUMENTS 4,621,432 A * 11/1986 Law ..................... B60D 1/36 116/28 R
4,627,634 A * 12/1986 Coleman ................. B60D 1/36 280/477
4,666,176 A * 5/1987 Sand ..................... B60D 1/36 280/477
4,708,359 A * 11/1987 Davenport ............... B60D 1/36 280/477
4,723,788 A * 2/1988 Suter ..................... B60D 1/36 116/28 R
4,741,111 A * 5/1988 Emerick ................. B60D 1/36 116/28 R
4,856,200 A * 8/1989 Riggs ..................... B60D 1/36 33/264
5,035,441 A * 7/1991 Murray ................... B60D 1/36 116/28 R
5,036,593 A * 8/1991 Collier ................... B60D 1/36 116/28 R
D345,539 S * 3/1994 Vaillancourt ............... D12/162
5,309,289 A * 5/1994 Johnson ................. B60R 1/003 359/872
5,385,363 A * 1/1995 Morey ..................... B60D 1/06 280/511
5,669,621 A * 9/1997 Lockwood ............... B60D 1/36 280/477
5,680,706 A * 10/1997 Talcott ................... B60D 1/36 116/28 R
6,209,902 B1 * 4/2001 Potts ..................... B60D 1/36 116/28 R
6,273,448 B1 * 8/2001 Cross ..................... B60D 1/36 280/477
6,279,940 B1 * 8/2001 Beavington ............. B60D 1/36 33/286
6,341,794 B1 * 1/2002 Hunter ................... B60D 1/065 116/28 R
6,585,281 B1 * 7/2003 Voorting ................. B60D 1/36 280/477
6,612,603 B2 * 9/2003 Alger ..................... B60D 1/36 359/872
6,820,888 B1 * 11/2004 Griffin ................... B60D 1/36 116/28 R
6,851,697 B2 * 2/2005 Kinnard ................. B60D 1/36 280/477
6,916,109 B2 * 7/2005 Julicher ................. B60D 1/36 362/540
7,753,393 B2 * 7/2010 Young ..................... B60D 1/36 116/28 R
7,891,691 B2 * 2/2011 Bearey ................... B60D 1/36 116/28 R
8,322,743 B1 * 12/2012 Klein ..................... B60D 1/36 280/477
9,649,899 B1 * 5/2017 Berry ..................... B60D 1/36
11,685,203 B1 * 6/2023 Perkins ................. B60D 1/06 280/477
2002/0070529 A1 * 6/2002 Dravecz ................. B60D 1/36 280/477
2002/0100175 A1 * 8/2002 King ..................... B60D 1/065 116/28 R
2002/0125685 A1 * 9/2002 White ..................... B60D 1/36 280/477
2003/0051654 A1 * 3/2003 Jarosek ................. B60D 1/36 116/28 R
2005/0173891 A1 * 8/2005 LeBouef ................. B60D 1/36 280/477
2005/0194761 A1 * 9/2005 Givens ................... B60D 1/36 280/477
2018/0037076 A1 * 2/2018 Jarrett ................... B60Q 1/484
2020/0406695 A1 * 12/2020 Andersen ............... B60D 1/488

* cited by examiner

TRAILER COUPLER AND METHOD FOR SAME

PRIORITY

The present invention claims priority to U.S. Provisional No. 63/295,979 filed Jan. 3, 2022, the entirety of which is hereby incorporated by reference.

BACKGROUND OF THE INVENTION

Technical Field

The present invention relates to a system and method for coupling to a trailer.

Description of Related Art

A vehicle must couple to a trailer for a variety of reasons. Often seeing the trailer to couple with a trailer hitch is difficult. Consequently, there is a need to aid drivers in coupling with a trailer.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Several embodiments of Applicant's invention will now be described with reference to the drawings. Unless otherwise noted, like elements will be identified by identical numbers throughout all figures. The invention illustratively disclosed herein suitably may be practiced in the absence of any element which is not specifically disclosed herein.

Figure 1:
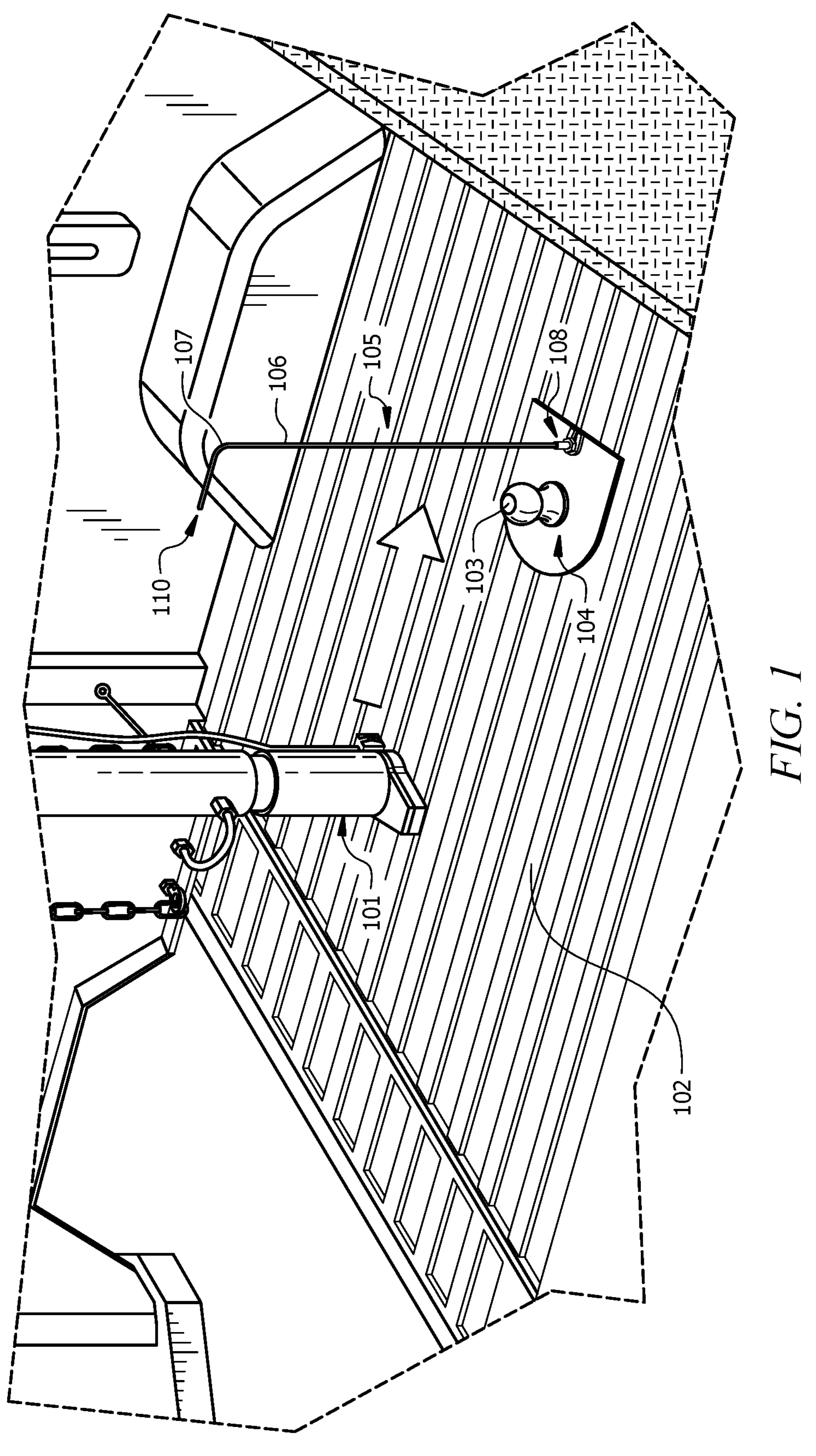
FIG. 1 is a perspective view of the indicator in one embodiment.

FIG. 1 is a perspective view of the indicator in one embodiment. As depicted, the hitch 103 is a gooseneck hitch. However, this is for illustrative purposes only and should not be deemed limiting. Virtually any type of hitch can be utilized.

A gooseneck hitch is a hitch which is located in the bed 102 of a truck. This location makes coupling to a trailer 101 difficult as it is difficult for the driver to visually see both the trailer/trailer mount 101 and the hitch 103. The trailer mount 101 is the portion of the trailer which mounts to the hitch 103.

While a truck is shown in the figures, this is for illustrative purposes only and should not be deemed limiting. The system and method can be used with any vehicle to couple the hitch on the vehicle to an item which is typically coupled to a hitch such as a trailer. Thus, vehicle can include any vehicle which can attach to a trailer. This includes side-by-sides, busses, cars, trucks, vans, mowers, etc.

As shown, the system comprises a hitch 103, a base 104, a coupler 108, and an indicator 105. As noted, the hitch 103 can comprise virtually any hitch known in the art. The size of the hitch 103 can vary depending upon the application. In some embodiments the hitch 103 is part of the vehicle.

The base 104 couples the coupler 108 to the vehicle and the hitch 103. In some embodiments the hitch 103 is removed and the base 104 is installed beneath the hitch 103. In some embodiment the base 104 is substantially planar. The base 104 can be coupled to the vehicle in any method or via any device known in the art. This can include bolts, screws, welding, and the like.

Coupled to the base 104 is the coupler 108. The coupler 108 can comprise any method or device which couples the indicator 105, discussed in more detail below, to the base 104. The coupler 108 can comprise a nut, bolt, lock, screws, welding, etc. In some embodiments the indicator 105, as an example, comprises a bolt, and the coupler 108 comprises a nut.

The indicator 105 can comprise any material including metal, aluminum, plastic, rubber, wood, and combinations thereof. As depicted in FIG. 1, the indicator 105 comprises a vertical indicator 106 and a horizontal indicator 107.

Figure 3:
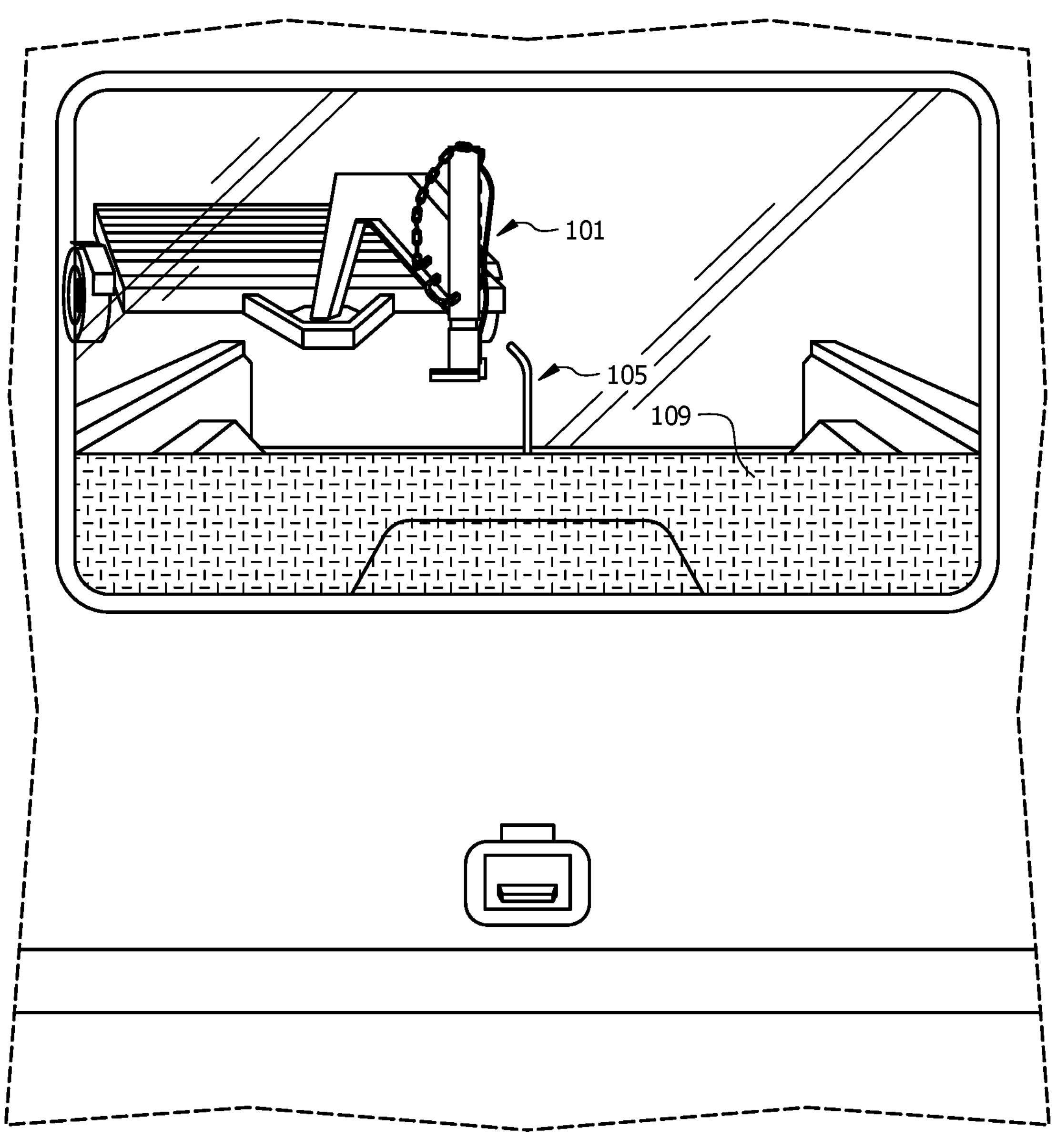
FIG. 3 is a perspective view of the indicator system from the rear window in one embodiment.

The vertical indicator 106 provides distance from the base 104 to raise above optical instructions so the driver can see the top of the vertical indicator 106 from the driver's seat. Turning to FIG. 3, FIG. 3 is a perspective view of the indicator system from the rear window in one embodiment. This is the view from the driver's seat facing rearward toward to the hitch. As shown, an optical obstruction 109 prevents the driver from seeing the hitch 103. As shown, the optical obstruction 109 is a tool box which prevents the user from seeing the actual hitch 103. This is particularly problematic when the hitch 103 is located in the truck's bed. Other optical obstructions exist which prevent the user from seeing the hitch 103. With such obstructions, it is very difficult to align the trailer mount 101 with the hitch 103, which is not visible to the driver. The indicator 105, however, can be seen despite the optical obstruction 109. The driver can see the trailer mount 101 and the indicator 105. This allows the driver to align the trailer/trailer mount 101 with the indicator 105 and couple the trailer/trailer mount 101 to the hitch 103.

The vertical indicator 106 is the vertical portion of the indicator 105. The length of the vertical portion can be adjusted depending upon the depth of the bed, size of the truck, size of the optical obstruction, etc. In some embodiments the indicator 105 comprises an adjustable length so the user can adjust the length to meet the specific needs. In other embodiments, however, the length is not adjustable. In one embodiment the vertical indicator 106 is approximately vertical, although in other embodiments the vertical indicator 106 can be bent or be at an angle that is not perpendicular to the horizontal portion 109.

As noted, the length of the vertical indicator 106 can vary depending upon the desired application. The vertical indicator 106, in some embodiments, ranges from 1 to 4 feet or more. As seen in FIG. 3, the vertical indicator 106 needs to be of sufficient length The vertical indicator 106 has a first end which is coupled to the coupler, and a second end which is coupled to the horizontal indicator 107. The two indicators 106/107 can comprise two separate pieces which are coupled to one another, or they can comprise an integrally made piece.

In one embodiment, the horizontal indicator 107 is the approximately perpendicular to the vertical indicator 106. If the vertical indicator 106 is vertical, the horizontal indicator 107 has a length which is equal to the horizontal offset from the coupler 108 to the hitch 103. In some embodiments there must be some offset because the indicator 105 cannot be located directly at the hitch 103. Instead, the coupler 108 is slightly offset by a distance. The offset distance can vary from a few inches to a foot or more. The offset distance will depend upon the spacing between the hitch and the coupler. The horizontal indicator 107 closes that gap.

The horizontal indicator 107 has two ends. A first end is coupled to the vertical indicator 106. The second end is not coupled to the vertical indicator 106 and is instead a free end 110. The free end 110 of the horizontal indicator 107 is the end which is not attached to the vertical indicator 106. The free end 110 is directly above, and vertically offset from, the hitch 103. Thus, when the driver positions the free end 110 to where it is touching the trailer mount 101, the trailer opening which couples to the hitch 103 is directly above the hitch 103.

As with the vertical indicator 106, in some embodiments the horizontal indicator 107 is adjustable. Thus, the user can modify the length of the horizontal indicator 107 to exactly match the specific hitch 103. In one embodiment, the goal is to have the free end 110 directly above and vertically offset from the hitch 103 in such a manner that the free end is visible to the operator of the vehicle.

In some embodiments the free end 110 is simply the end of a rod or other material. In other embodiments, however, the free end 110 has a magnified end. A magnified end refers to any end which separates itself visually from the remainder of the indicator 105. A magnified end can be a larger object such as a tennis ball which is more easily viewable from the driver. The magnified end can also comprise something such as a contrasting color which allows the operator to better see the free end 110. A contrasting end can comprise a red dot, a red end, another color, or a change in contrast to allow the operator to clearly see the free end 110.

Figure 2:
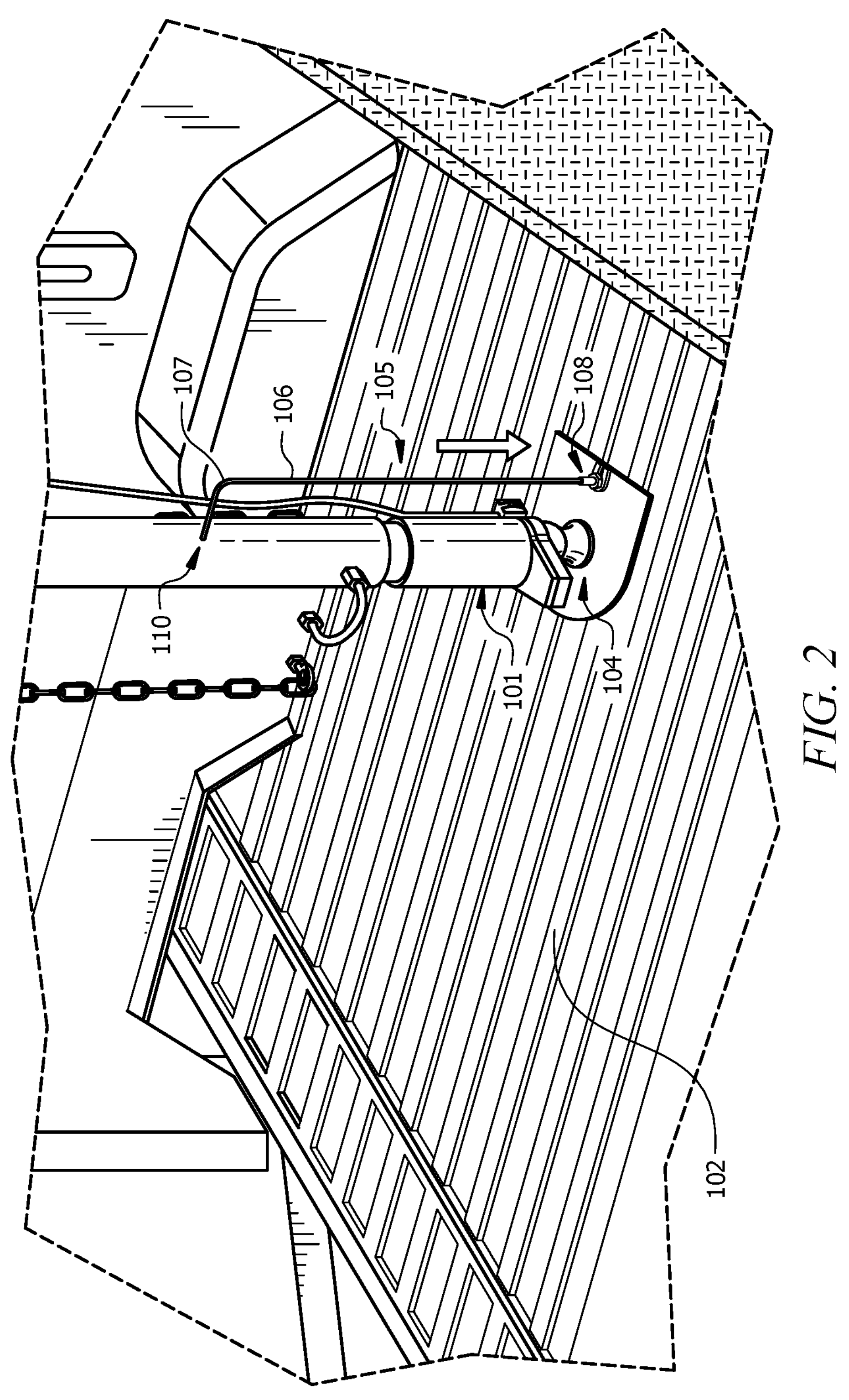
FIG. 2 is a perspective view of the indicator system with a trailer in one embodiment.

Turning to FIG. 2, FIG. 2 is a perspective view of the indicator system with a trailer in one embodiment. As compared to FIG. 1, the user has backed the vehicle up to where the trailer mount 101 is touching the free end 110. The driver can visually see the two are touching.

As shown, the vertical indicator 106 extends upward away from said base 104. The vertical indicator 106 couples with the horizontal indicator 107, which as depicted, is approximately perpendicular to the vertical indicator 106. The free end 110 of the horizontal indicator 107 is located above but vertically offset from the hitch 103. Because the free end 110 of the horizontal indicator 107 is touching the trailer mount 101, the trailer mount 101 is directly above and vertically offset from the hitch 103.

In one embodiment the free end 110 is directly above and vertically offset from the end of the hitch which is closes to the vertical indicator 106. In this way, the receiver of the trailer mount 101 is positioned directly above the hitch 103 such that when the trailer mount 101 is lowered, it will receive the hitch 103 in the hitch receiver.

In some embodiments the indicator 105 has some bend and flex. When the driver sees the trailer mount 101 contact and, in some embodiments, move the indicator 105, the driver has confirmation that the trailer mount 101 is directly above the hitch 103. Consequently, the driver need only lower the trailer mount 101 to couple it to the hitch 103, coupling the trailer with the vehicle.

Without the system described herein, if the driver was optically obstructed from viewing the hitch 103, such as shown in FIG. 3, the driver had to make small adjustments, get out of the truck, go see where the hitch 103 is relative to the trailer mount 101, make minor adjustments, and repeat again.

Getting out of the vehicle to visually check the hitch 103 relative to the trailer mount 101 is a tedious and laborious exercise. Often the vehicles pulling such trailers are large trucks. The driver must climb up and down a large truck multiple times to couple to a trailer. When this is repeated several times a day, this is a lot of effort and time. Conversely, the system and method discussed herein allows for visual confirmation, from inside a vehicle which may have previously offered an obstructed view, that the hitch 103 is positioned in the correct location below the trailer mount 101.

Now that the system has been described, a method describing the use will be described. A method of coupling a trailer to a vehicle includes the step of coupling a base to a vehicle. As noted, this can include coupling via a bolt, screw, welding, etc.

An indicator comprises a horizontal indicator 107 and a vertical indicator 106 is coupled to the base 104 via any method or device known in the art. In one embodiment the horizontal indicator 107 has a first end coupled to the vertical indicator 106 and a second end which is a free end.

Next, the user ensures that the free end 110 of the horizontal indicator 107 is located above and vertically offset from the hitch 103. This can involve adjusting the length of the horizontal indicator 107 if necessary. The user can also ensure that the free end 110 of the horizontal indicator 107 is visible from within the vehicle. If the free end 110 is still visibly obstructed, the user can lengthen or shorten the vertical indicator 106 as necessary until the free end 110 is visible.

The user then watches the free end 110 while adjusting the location of the vehicle, and accordingly the free end 110, to position the vehicle such that the free end 100 is adjacent to the trailer mount 101. In some embodiments the user will ensure that the free end 110 is touching the trailer mount 101. This ensures that the trailer mount 101 receiver hitch is directly above the hitch 103.

Once the user has visual confirmation that the trailer mount 101 is adjacent to the free end 110, and thus above and vertically offset from the hitch 103, the user can exit the vehicle and lower the trailer mount 101. As noted above, the user can see that the trailer mount 101 is touching the free end 110, so the user knows, before he or she exits the vehicle that the trailer mount 101 is in the perfect position. The user can then lower the trailer mount 101 without making any additional adjustments to the vehicle to reposition the mount 103 relative to the trailer mount 101. As noted, this is a huge time saver, especially if the user is coupling the trailer mount 101 without any other assistance.

The system and method has many advantages. First, it allows a user to couple to a trailer without external guidance or assistance. Often a user must couple the trailer in a location where there is no one else there to guide the user to make necessary adjustments. Because the user can now have visual confirmation that the trailer mount 101 is in the correct position relative to the lower hitch 103, the user does not need to get out of the vehicle multiple times to check on the status of the trailer mount 101 relative to the hitch 103. As noted, often the user was prevented from seeing the relative positions of the trailer mount 101 and the hitch 103 because of a visual obstruction such as the back of the vehicle. The indicator 105 elevates the free end 110 to a position which is visible to the user.

Second, the system and method increases safety. Every time the user gets in and out of the vehicle, the driver risks injury to himself or others. Minimizing these duplicate and unnecessary trips increases safety.

Third, the system can be installed very easily in almost any hitch. Because the indicator 105 is not weight bearing, the indicator need not be separately attached to the vehicle. Rather, the indicator 105 needs to be attached to the base 104 which can be easily accomplished without welding, screwing, etc.

While the invention has been particularly shown and described with reference to a preferred embodiment, it will be understood by those skilled in the art that various changes in form and detail may be made therein without departing from the spirit and scope of the invention.

What is claimed is:

1. A system for a trailer indicator, said system comprising:

a base;

a coupler located on said base;

an indicator located on said base, wherein said indicator comprises a horizontal indicator and a vertical indicator;

a hitch located on said base;

wherein said vertical indicator extends upward away from said base, and wherein said horizontal indicator comprises a first end coupled to said vertical indicator and a second end which is a free end, and wherein said free end is located directly above but vertically offset from said hitch.

2. The system of claim 1 wherein said vertical indicator is adjustable.

3. The system of claim 1 wherein said horizontal indicator is adjustable.

4. The system of claim 1 wherein said base is installed beneath the hitch.

5. The system of claim 1 wherein said indicator comprises aluminum.

6. The system of claim 1 wherein said horizontal indicator comprises a first end coupled to said vertical indicator, and a second end which is a free end.

7. The system of claim 6 wherein said free end comprises a magnified end.

8. The system of claim 7 wherein said free end comprises a contrasting end.

9. The system of claim 1 further comprising a vehicle, wherein said vehicle comprises a hitch, and wherein said base couples to said vehicle.

10. A method of coupling a trailer to a vehicle, said method comprising the steps of:

a) coupling a base to a vehicle, wherein said base is coupled to a hitch;

b) coupling an indicator to said base, wherein said indicator comprises a horizontal indicator and a vertical indicator, and wherein said horizontal indicator comprises a first end coupled to said vertical indicator and a second end which is a free end;

c) ensuring said free end of said horizontal indicator is located directly above said hitch;

d) watching said free end and adjusting said vehicle such that the free end is adjacent to a trailer mount and above said hitch.

11. The method of claim 10 wherein ensuring of step c) comprises adjusting said horizontal indicator.

12. The method of claim 10 further comprising the step of adjusting said vertical indicator to ensure said free end of said horizontal indicator is visible to an operator within the vehicle.

13. The method of claim 10 wherein said using of step d) comprises maneuvering said vehicle such that said trailer mount touches said free end.

14. The method of claim 10 wherein said free end comprises a magnified end to aid in a user seeing said free end.

15. The method of claim 10 wherein said free end comprises a contrasted end to aid in a user seeing said free end.

16. The method of claim 10 wherein said indicator bends in response to making contact with said trailer mount.

17. The method of claim 10 further comprising lowering said trailer mount to couple to said hitch.

* * * * *